April 17, 1928.                                              1,666,473
J. SLEPIAN
HIGH VOLTAGE DIRECT CURRENT SYSTEM
Filed Feb. 26, 1921
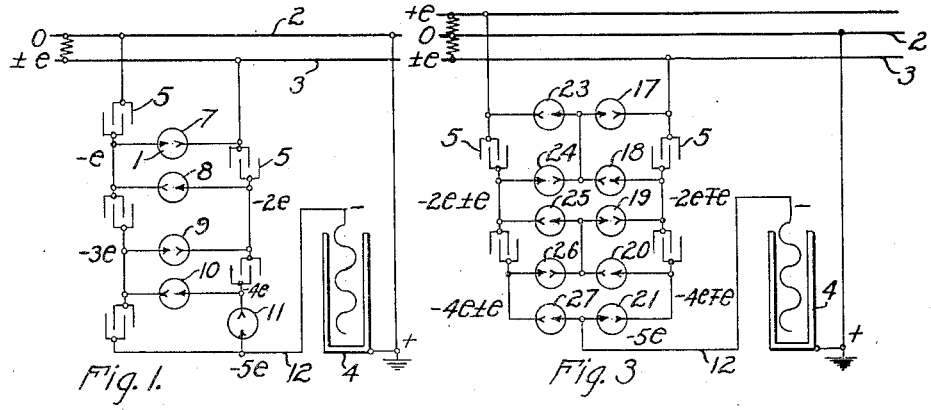
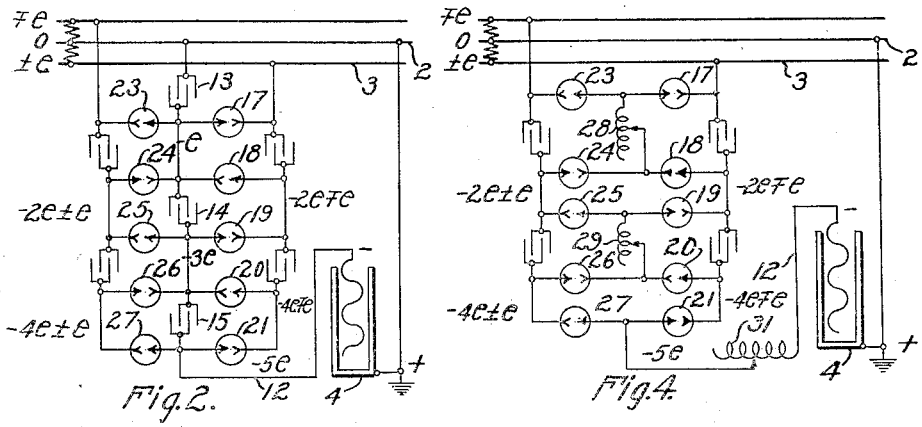
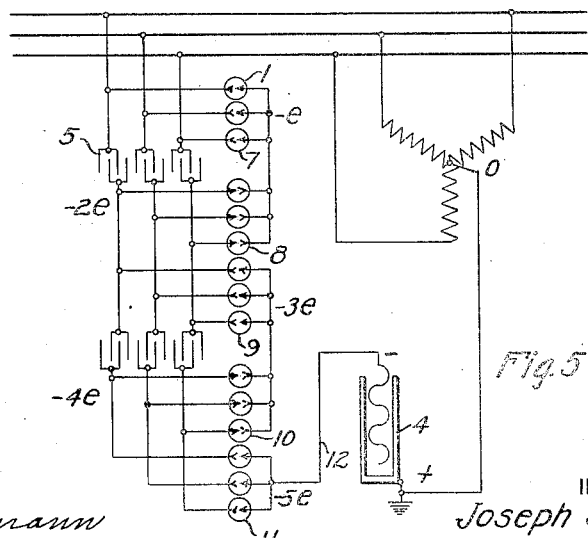
WITNESSES:
L. F. Sonnemann
H. Keith
INVENTOR
Joseph Slepian.
BY
Wesley G. Carr
ATTORNEY Patented Apr. 17, 1928.

1,666,473

UNITED STATES PATENT OFFICE.

JOSEPH SLEPIAN, OF SWISSVALE, PENNSYLVANIA, ASSIGNOR TO WESTINGHOUSE ELECTRIC & MANUFACTURING COMPANY, A CORPORATION OF PENNSYLVANIA.

HIGH-VOLTAGE DIRECT-CURRENT SYSTEM.

Application filed February 26, 1921. Serial No. 448,148.

My invention relates to means for producing current at high voltage and it has particular relation to the production of unidirectional current of high voltage.

The object of my invention is to produce current which will be suitable for use with precipitating apparatus and the like requiring high unidirectional voltages.

Apparatus of similar character has been employed, which, in many instances, is open to objections arising from difficulties in arrangement which involve problems of insulation.

My invention will be described in connection with the accompanying drawings, in which Figure 1 represents, diagrammatically, apparatus and circuits embodying my invention.

Figs. 2, 3, 4 and 5 are modifications of the system shown in Fig. 1.

Referring particularly to Fig. 1, a group of asymmetric devices or rectifiers 1 are connected in series relation with a source of alternating-current energy supplied by conductors 2 and 3, in which circuit is included a precipitator 4. Two groups of condensers 5 are connected to the conductors and are interconnected with the rectifiers.

We may assume the voltage of conductor 2 is zero, while the voltage of conductor 3 alternates from $+e$ to $-e$. When conductor 3 has a voltage of $-e$ the alternate rectifiers 7, 9 and 11 transmit current to the right-hand group of condensers which become charged. When the conductor 3 has a voltage of $+e$, the rectifiers 8 and 10 transmit current from the right-hand to the left-hand group of condensers, the left-hand group then receiving the charge.

The charge is thus transmitted back and forth between the condenser groups and is, at each time, advanced from one to the succeeding condenser. The voltage is increased a constant degree $e$ each time the current is transmitted from the one to the other of the condenser groups.

Thus, during the first half-cycle, when the conductor 3 is at a potential of $-e$, it is evident that the first condenser of the left-hand group will be charged to a potential of $-e$ through the rectifier 7. During the second half-cycle, when the conductor 3 is at a potential of $+e$, the first left-hand condenser discharges into the first right-hand condenser, reducing its own charge to zero and charging the latter condenser to $-e$. During the third half-cycle, the latter condenser retains its charge, (disregarding, for the moment, the effect of the remaining condensers in the series), and the first left-hand condenser regains its charge of $-e$. In the fourth half-cycle, the two condensers being in series, with their charges opposing each other, the line voltage $e$ is effective to add a charge of $\frac{1}{2}e$ to each condenser, reducing the charge of the first left-hand condenser to $-\frac{1}{2}e$ and increasing the charge of the right-hand condenser to $-1\frac{1}{2}e$. Similarly, in the sixth and eigth half-cycles, the left-hand condenser will be charged successively to $-\frac{3}{4}e$ and $-\frac{7}{8}e$, while the right-hand condenser will be charged to $-1\frac{3}{4}e$ and $-1\frac{7}{8}e$, respectively. Thus, the charge on the first left-hand condenser finally becomes constant at $-e$, while the charge across the first right-hand condenser becomes constant at $-2e$.

Considering, now, the first two condensers in the left-hand group and the first condenser in the right-hand group, it is evident that the charge across the second left-hand condenser will ultimately build up to $-2e$, making its terminal potential $-3e$, or the sum of the charge on the first two left-hand condensers.

Similarly, all of the other condensers build up charges of $-2e$, producing a final potential of $-5e$ at the end of a string of three condensers in the left-hand series, as shown in Fig. 1.

In Figure 1, it will be apparent that, for a voltage of $-e$ in conductor 3, a resultant unidirectional voltage of $-5e$ is impressed on conductor 12, transmitting current from the precipitator 4. It will be noted that the voltage strains are equally distributed between the several condensers.

Fig. 2 represents a combination of two single-phase alternating-current circuits, previously described, in which a central group, having condensers 13, 14 and 15, corresponds to the left-hand group of condensers in Fig. 1. Rectifiers 17, 18, 19, 20 and 21 are connected to operate 180° out of phase, respectively, with rectifiers 23, 24, 25, 26 and 27. Therefore, when rectifiers 24 and 26 are transmitting energy to the central group of condensers, the rectifiers 17 and 19 are transmitting energy from the central group or are withdrawing the current charge transmitted to the central group. Similarly, current transmitted by rectifiers 18 and 20 is withdrawn by rectifiers 23 and 25, hence, this central group of condensers may be reduced to small capacity or omitted.

Fig. 3 is similar to Fig. 2, except that condensers 13, 14 and 15 of the latter figure have been omitted. In Fig. 3, the rectifiers are active only at the maximum alternating voltages. A better time efficiency of the rectifiers and a voltage wave of more nearly perfect form is produced by the employment of reactances which sustain the rectified current in a well known manner.

Fig. 4 is a representation of the connections of Fig. 3, with the addition of reactances 28, 29 and 31. In such an arrangement, even with light load, there is a pulsation in the resultant unidirectional voltage of double frequency and of double the value of $e$. Thus pulsation is reduced by the employment of polyphase circuits, as illustrated in Fig. 5, in which we have a combination of three single-phase circuits similar to that represented in Fig. 1. The rectified wave forms are 120° out of phase, respectively, and overlap to produce a resultant wave which has a pulsation of small amplitude.

The uses of rectifiers, condensers and reactances are well known but I have employed them in connection with my invention to produce new results and for the purpose of producing unidirectional current at a high voltage which is limited only by the number of units employed and by their respective efficiencies. The condenser capacities are reduced to a minimum, which is a primary consideration.

I claim as my invention:—

1. The combination, with an alternating-current source including two line-conductors, of an assembly of rectifiers and condensers including two sets of condensers, each set comprising a plurality of serially connected condensers, means for conductively connecting one terminal of each of said sets to one of the line conductors, whereby one set is connected to each line conductor, a plurality of rectifying devices, alternately conducting positive and negative currents, connected to a plurality of points distributed along the said sets, whereby a common point in one set is connected, through two oppositely conducting rectifying circuits, to the two opposite terminals of one of the condensers of the other set, and means for connecting a unidirectional-current load device between the source and the free ends of the said sets.

2. The combination, with an alternating-current source including a neutral point and a plurality of line-conductors having different phases, of an assembly of rectifiers and condensers including a similar series of conductively connected condensers for the respective line-conductors, each series having one end conductively connected to its line conductor, the correspondingly positioned condensers of the several series being connected together in a group as follows: a first group of rectifiers being conductively connected to the terminals, nearest the source, of the respective condensers of said group, a second group of rectifiers being conductively connected to the other terminals of the said condensers, the two groups of rectifiers being conductively connected together in a common point, the rectifiers of one of said groups conducting currents toward said common point and the rectifiers of the other group conducting currents away from said common point, when the potentials are of the proper signs; and a unidirectional-current load circuit comprising a terminal conductively connected to the neutral point of said source and a second terminal connected as follows: a final group of rectifiers being conductively connected between the ends of the respective series of condensers and a common point constituting said second load terminal; the said final group of rectifiers and the first group of rectifiers for each of the groups of condensers in the respective series all conducting currents in the same directions, when the potentials are of the proper signs.

In testimony whereof, I have hereunto subscribed my name this 18th day of February, 1921.

JOSEPH SLEPIAN.